US009314920B1

(12) United States Patent
Jutras, Jr.

(10) Patent No.: US 9,314,920 B1

(45) Date of Patent: Apr. 19, 2016

(54) ILLUMINATED HOOK FOR RETRIEVING FALLEN ITEMS

(71) Applicant: John P. Jutras, Jr., Gloucester, VA (US)

(72) Inventor: John P. Jutras, Jr., Gloucester, VA (US)

( * ) Notice: Subject to any disclaimer, the term of this patent is extended or adjusted under 35 U.S.C. 154(b) by 65 days.

(21) Appl. No.: 14/457,289

(22) Filed: Aug. 12, 2014

(51) Int. Cl.

*F21V 33/00* (2006.01)
*B25J 1/04* (2006.01)
*B25J 19/00* (2006.01)

(52) U.S. Cl.

CPC .. *B25J 1/04* (2013.01); *B25J 19/00* (2013.01); *F21V 33/008* (2013.01)

(58) Field of Classification Search

CPC ................ B25J 1/02; B25J 1/04; B25J 19/00; F21V 33/08; A01D 46/24

See application file for complete search history.

(56) References Cited

U.S. PATENT DOCUMENTS 2,358,867 A 9/1944 Madan
5,003,437 A * 3/1991 Barrett .................... F21L 11/00 114/221 R
5,381,319 A * 1/1995 Shiao ........................ B25B 9/00 135/910
6,065,787 A * 5/2000 Jarosch ..................... B25B 9/00 294/210
7,001,037 B1 * 2/2006 Shiao .................. F21V 33/0084 362/109
7,121,038 B1 10/2006 Smith
7,490,880 B1 * 2/2009 Matsui .................... A47F 13/06 294/210
8,162,363 B2 * 4/2012 Wang .................... B25B 11/002 294/210
8,746,918 B1 * 6/2014 Rubino ..................... F21L 4/04 359/221.2

* cited by examiner

*Primary Examiner* — Ali Alavi

(74) *Attorney, Agent, or Firm* — Crossley & Stevenson IP Law

(57) ABSTRACT

An illuminated hook for retrieving fallen items including a telescoping rod having a top end, a crook disposed proximal the top end, a hinge disposed on the top end, a transparent hook having a cavity, the hook disposed on the hinge, and a plurality of illuminable light fixtures disposed within the cavity. Thus, the illuminated hook provides a flexible light source that shines directly through the transparent hook making it possible to illuminate items directly with the hook, allowing for illumination of areas impossible to illuminate without the pivotable transparent hook, greatly improving the retrievability of the illuminated hook for retrieving fallen items.

18 Claims, 3 Drawing Sheets

ILLUMINATED HOOK FOR RETRIEVING FALLEN ITEMS

BACKGROUND OF THE INVENTION

Various types of illuminated retrieval devices are known in the prior art. However, what is needed is an illuminated hook for retrieving fallen items including a telescoping rod having a top end, a crook disposed proximal the top end, a hinge disposed on the top end, a transparent hook having a cavity, and a plurality of illuminable light fixtures disposed within the cavity. Thus, the illuminated hook allows a user a flexible light source that shines directly through the transparent hook making it possible to illuminate items directly with the hook, greatly improving the retrievability of the illuminated hook for retrieving fallen items.

FIELD OF THE INVENTION

The present invention relates to a hook for retrieving fallen items, and more particularly, to an illuminated hook for retrieving fallen items.

SUMMARY OF THE INVENTION

The general purpose of the present illuminated hook for retrieving fallen items, described subsequently in greater detail, is to provide an illuminated hook for retrieving fallen items which has many novel features that result in an illuminated hook for retrieving fallen items which is not anticipated, rendered obvious, suggested, or even implied by prior art, either alone or in combination thereof.

To accomplish this, the present illuminated hook for retrieving fallen items includes a telescoping rod having a top end, a bottom end, and a crook proximal the top end. The crook makes the illuminated hook for retrieving fallen items better adapted for maneuverability in hard to reach areas. A handle is disposed on the bottom end. The handle can be made of any suitable material. A hinge having a single axis is disposed on the top end.

The illuminated hook for retrieving fallen items further includes a transparent hook having an adaptor end, an attachment end, and a cavity. The attachment end is fixedly pivotally engaged with the hinge, wherein the hook pivots about the axis of the hinge. As with most hinges, the hinge can be tightened or loosened to adjust the ease with which the hook pivots about the axis.

A plurality of light fixtures is disposed within the cavity. A power switch is disposed on the rod proximal the crook. A battery housing is disposed on the rod proximal the power switch. A battery is disposed within the battery. The battery housing, the power switch, and the light fixtures are all in operational communication with each other. A pointed tip is disposed on the adaptor end of the hook. The pointed tip is formed of a silicon and alternately a soft rubber.

Thus has been broadly outlined the more important features of the present illuminated hook for retrieving fallen items so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
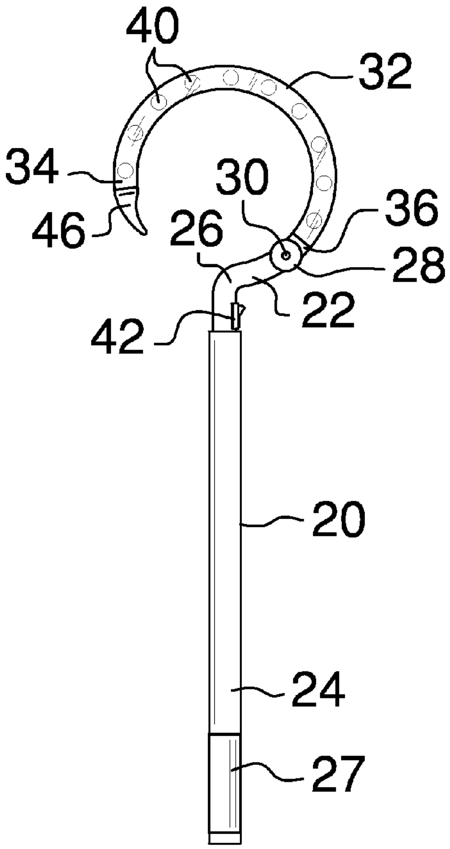
FIG. 1 is a front view.
Figure 2:
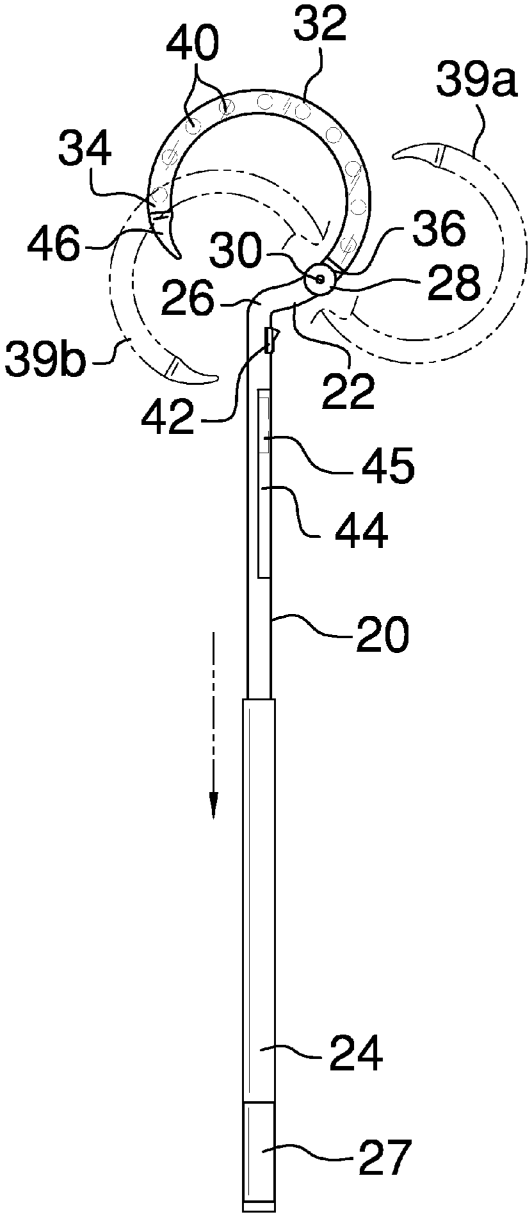
FIG. 2 is a front extended view.
Figure 3:
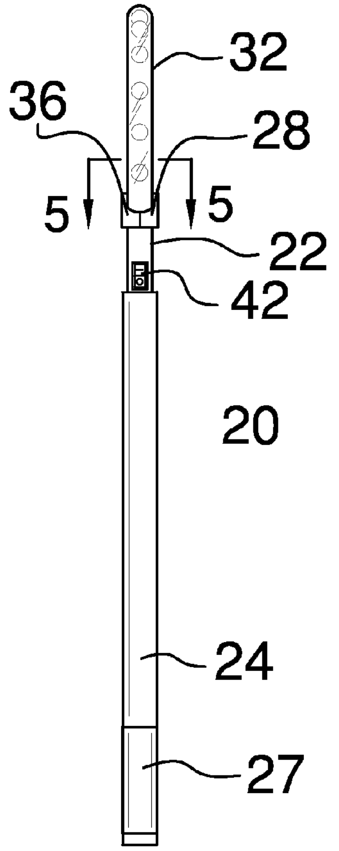
FIG. 3 is a side view.
Figure 4:
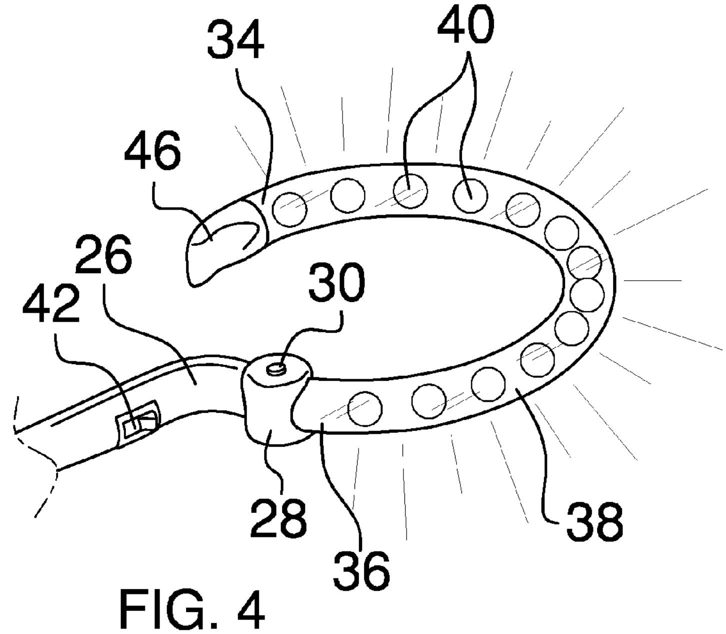
FIG. 4 is a isometric view.
Figure 5:
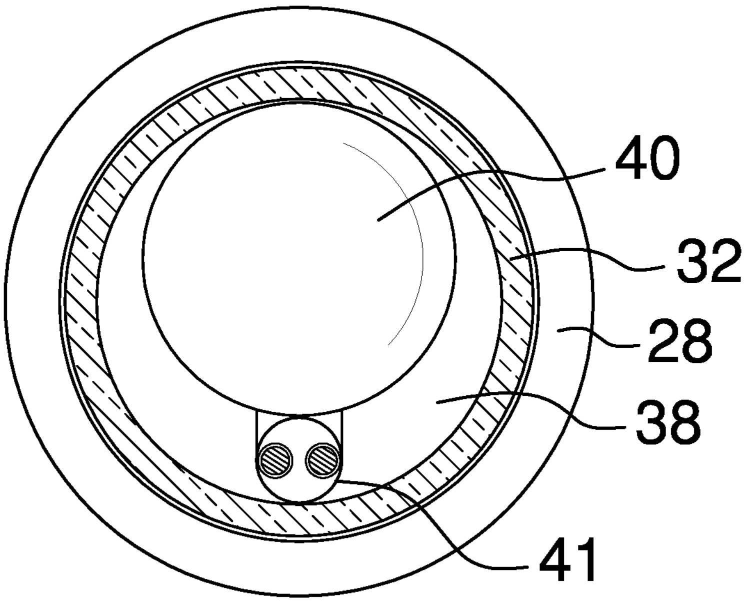
FIG. 5 is a cross sectional view of the attachment end of the hook

With reference now to the drawings, and in particular FIGS. 1 through 5 thereof, an example of the instant illuminated hook for retrieving fallen items employing the principles and concepts of the present illuminated hook for retrieving fallen items and generally designated by the reference number 10 will be described.

Referring to FIGS. 1 through 5, the present illuminated hook for retrieving fallen items 10 is illustrated. The illuminated hook for retrieving fallen items 10 includes a telescoping rod 20 having a top end 22, a bottom end 24, and a crook 26 proximal the top end 22. The crook makes the illuminated hook for retrieving fallen items 10 better adapted for maneuverability in hard to reach areas. A handle 27 is disposed on the bottom end 24. The handle 27 can be made of any suitable material. A hinge 28 having at least one axis 30 is disposed on the top end 22.

The illuminated hook for retrieving fallen items 10 further includes a transparent hook 32 having an adaptor end 34, an attachment end 36, and a cavity 38. The attachment end 36 is fixedly pivotally engaged with the hinge 28, wherein the hook 32 pivots about at least one of the axis 30 of the hinge 28. The hook pivots from an initial position 39*a* to a terminal position 39*b*, wherein in the initial position 39*a* the hook tip is positioned away from the rod 20 and in the terminal position 39*b* the hook tip is positioned proximal the rod 20. As with most hinges, the hinge 28 can be tightened or loosened to adjust the ease with which the hook 32 pivots about the axis 30.

A plurality of light fixtures 40 is disposed within the cavity 38. The light fixtures each having an electrical connector 41 configured to provide operational communication. Disposing the light fixtures 40 within the cavity 38 allows the user a flexible light source that shines directly through the transparent hook 32 making it possible to illuminate items directly with the hook 38, thus allowing for illumination of areas impossible to illuminate without a flexible hook. The light fixtures 40 can be LED lights or LED rope lights.

A power switch 42 is disposed on the rod 20 proximal the crook 26. A battery housing 44 is disposed on the rod 20 proximal the power switch 42. A battery 45 is disposed within the battery housing 44. The battery housing 44, the battery 45, the power switch 42, and the light fixtures 40 are all in operational communication with each other. A pointed tip 46 is removably disposed on the adaptor end 34 of the hook 32. The pointed tip 46 is formed of a silicon and alternately a soft rubber.

What is claimed is:

1. An illuminated hook for retrieving fallen items comprising:

a telescoping rod having a top end, a bottom end, and a crook proximal the top end;

a handle disposed on the bottom end;

a hinge disposed on the top end, wherein the hinge has at least one axis;

a transparent hook having an adaptor end, an attachment end, and a cavity, the attachment end fixedly pivotally engaged with the hinge, wherein the hook pivots about at least one of the axis of the hinge;

a plurality of light fixtures disposed within the cavity;

a power switch disposed on the rod proximal the crook;

a power source disposed on the rod proximal the power switch, wherein the power source, the power switch, and the light fixtures are in operational communication with each other.

2. The illuminated hook for retrieving fallen items of claim 1 further comprising:

a pointed tip removably disposed on the adaptor end of the hook.

3. The illuminated hook for retrieving fallen items of claim 2 wherein the pointed tip is formed of silicon.

4. The illuminated hook for retrieving fallen items of claim 2 wherein the pointed tip is formed of a soft rubber.

5. The illuminated hook for retrieving fallen items of claim 3 wherein the plurality of light fixtures are LED lights.

6. The illuminated hook for retrieving fallen items of claim 3 wherein the plurality of light fixtures is an LED rope light.

7. The illuminated hook for retrieving fallen items of claim 4 wherein the plurality of light fixtures are LED lights.

8. The illuminated hook for retrieving fallen items of claim 4 wherein the plurality of light fixtures is an LED rope light.

9. The illuminated hook for retrieving fallen items of claim 5 wherein the power source is a battery.

10. The illuminated hook for retrieving fallen items of claim 6 wherein the power source is a battery.

11. The illuminated hook for retrieving fallen items of claim 7 wherein the power source is a battery.

12. The illuminated hook for retrieving fallen items of claim 8 wherein the power source is a battery.

13. The illuminated hook for retrieving fallen items of claim 8 wherein the hinge has a single axis;

wherein the hook pivots about the axis of the hinge; and wherein the hook pivots from an initial position to a terminal position, wherein in the initial position the hook tip is positioned away from the rod and in the terminal position the hook tip is positioned proximal the rod.

14. The illuminated hook for retrieving fallen items of claim 9 wherein the hinge has a single axis;

wherein the hook pivots about the axis of the hinge; and wherein the hook pivots from an initial position to a terminal position, wherein in the initial position the hook tip is positioned away from the rod and in the terminal position the hook tip is positioned proximal the rod.

15. The illuminated hook for retrieving fallen items of claim 10 wherein the hinge has a single axis;

wherein the hook pivots about the axis of the hinge; and wherein the hook pivots from an initial position to a terminal position, wherein in the initial position the hook tip is positioned away from the rod and in the terminal position the hook tip is positioned proximal the rod.

16. The illuminated hook for retrieving fallen items of claim 11 wherein the hinge has a single axis;

wherein the hook pivots about the axis of the hinge; and wherein the hook pivots from an initial position to a terminal position, wherein in the initial position the hook tip is positioned away from the rod and in the terminal position the hook tip is positioned proximal the rod.

17. The illuminated hook for retrieving fallen items of claim 12 wherein the hinge has a single axis;

wherein the hook pivots about the axis of the hinge; and wherein the hook pivots from an initial position to a terminal position, wherein in the initial position the hook tip is positioned away from the rod and in the terminal position the hook tip is positioned proximal the rod.

18. An illuminated hook for retrieving fallen items comprising:

a telescoping rod having a top end, a bottom end, and a crook proximal the top end;

a handle disposed on the bottom end;

a hinge disposed on the top end, wherein the hinge has at least one axis;

a transparent hook having an adaptor end, an attachment end, and a cavity, the attachment end fixedly pivotally engaged with the hinge, wherein the hook pivots about at least one of the axis of the hinge;

a plurality of LED lights disposed within the cavity;

a power switch disposed on the rod proximal the crook; and a battery disposed on the rod proximal the power switch, wherein the battery, the power switch, and the light fixtures are in operational communication with each other;

wherein the hook pivots from an initial position to a terminal position, wherein in the initial position the hook tip is positioned away from the rod and in the terminal position the hook tip is positioned proximal the rod.

* * * * *